United States Patent
Kato et al.

(10) Patent No.: US 11,814,048 B2
(45) Date of Patent: *Nov. 14, 2023

(54) VEHICLE TRAVEL CONTROL APPARATUS

(71) Applicant: TOYOTA JIDOSHA KABUSHIKI KAISHA, Toyota (JP)

(72) Inventors: Yuichi Kato, Toyota (JP); Yuko Hiratsuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

This patent is subject to a terminal disclaimer.

(21) Appl. No.: 17/543,165

(22) Filed: Dec. 6, 2021

(65) Prior Publication Data

US 2022/0089158 A1   Mar. 24, 2022

Related U.S. Application Data

(63) Continuation of application No. 16/816,711, filed on Mar. 12, 2020, now Pat. No. 11,299,156.

(30) Foreign Application Priority Data

Mar. 14, 2019   (JP) ................................ 2019-046713

(51) Int. Cl.
*B60W 30/17* (2020.01)
*B60W 30/165* (2020.01)
(Continued)

(52) U.S. Cl.
CPC .......... *B60W 30/17* (2013.01); *B60W 30/165* (2013.01); *B60W 30/18018* (2013.01);
(Continued)

(58) Field of Classification Search
CPC .............. B60W 30/17; B60W 30/165; B60W 30/18018; B60W 40/04; B60W 40/06;
(Continued)

(56) References Cited

U.S. PATENT DOCUMENTS 8,271,174 B2 * 9/2012 Okada .................. B60W 40/10
701/1
8,402,936 B2 * 3/2013 Nakamura .......... F02N 11/0837
123/347

(Continued)

FOREIGN PATENT DOCUMENTS

JP   2004218562 A * 8/2004 .......... F02N 11/0837
JP   2005-280397 A   10/2005
(Continued)

OTHER PUBLICATIONS

U.S. Appl. No. 16/816,711, filed Mar. 12, 2020, Yuichi Kato et al.

*Primary Examiner* — Angelina Shudy
(74) *Attorney, Agent, or Firm* — Dinsmore & Shohl LLP

(57) ABSTRACT

Provided is a vehicle travel control apparatus configured to set an operation mode of automatic start control to any one of a first mode, in which the automatic start control is executed, and a second mode, in which the automatic start control is not executed, the vehicle travel control apparatus being further configured to: issue to a driver a notification for inquiring whether the driver desires the automatic start control to be executed when the current travel state of an own vehicle is a specific state; and set the operation mode of the automatic start control to the first mode when the driver has performed a predetermined response operation in response to the notification.

9 Claims, 4 Drawing Sheets

(51) Int. Cl.
*B60W 30/18* (2012.01)
*B60W 40/04* (2006.01)
*B60W 50/14* (2020.01)
*B60W 40/06* (2012.01)
*G06V 20/56* (2022.01)
*B60W 50/00* (2006.01)

(52) U.S. Cl.
CPC ............ *B60W 40/04* (2013.01); *B60W 40/06* (2013.01); *B60W 50/14* (2013.01); *G06V 20/56* (2022.01); *B60W 2050/0095* (2013.01); *B60W 2554/406* (2020.02); *B60W 2556/45* (2020.02)

(58) Field of Classification Search
CPC ......... B60W 50/14; B60W 2050/0095; B60W 2554/406; B60W 2556/45; B60W 30/182; B60W 2540/215; B60W 30/16; G06V 20/56
See application file for complete search history.

(56) References Cited

U.S. PATENT DOCUMENTS

| | | | |
|---|---|---|---|
| 9,366,216 B2 | 6/2016 | Be et al. | |
| 9,896,101 B2 * | 2/2018 | Kato | B60W 30/165 |
| 9,925,981 B2 * | 3/2018 | Asakura | B60W 10/184 |
| 10,562,530 B2 * | 2/2020 | Kamatani | B60W 10/18 |
| 11,608,806 B2 * | 3/2023 | Kuretake | F02N 11/0837 |
| 2001/0027368 A1 | 10/2001 | Minowa | |
| 2005/0216169 A1 * | 9/2005 | Arai | B60K 31/0008 |
| | | | 180/170 |
| 2006/0025918 A1 | 2/2006 | Saeki | |
| 2006/0095194 A1 | 5/2006 | Arai | |
| 2009/0248267 A1 | 10/2009 | Boecker | |
| 2010/0017084 A1 * | 1/2010 | Riegel | B60T 8/1755 |
| | | | 701/1 |
| 2010/0152963 A1 * | 6/2010 | Heckel | B60W 30/17 |
| | | | 701/29.2 |
| 2011/0166775 A1 * | 7/2011 | Takeuchi | G01C 21/343 |
| | | | 701/533 |
| 2013/0191003 A1 | 7/2013 | Hahne | |
| 2016/0273468 A1 | 9/2016 | Kato et al. | |
| 2016/0311431 A1 * | 10/2016 | Kato | G01C 21/3617 |
| 2017/0249848 A1 | 8/2017 | Niino et al. | |
| 2018/0038952 A1 | 2/2018 | Shokonji | |
| 2018/0141551 A1 | 5/2018 | Sugano et al. | |
| 2018/0154824 A1 * | 6/2018 | Urano | G05D 1/0214 |
| 2018/0222480 A1 | 8/2018 | Shokonji | |
| 2018/0265079 A1 * | 9/2018 | Nakada | G05D 1/0223 |
| 2018/0298866 A1 * | 10/2018 | Okitsu | B60W 10/06 |
| 2019/0017486 A1 * | 1/2019 | Kuretake | B60W 30/18018 |
| 2019/0210600 A1 | 7/2019 | Etori et al. | |
| 2019/0351905 A1 | 11/2019 | Maus et al. | |
| 2020/0180639 A1 * | 6/2020 | Mizoguchi | G05D 1/0214 |
| 2020/0231159 A1 * | 7/2020 | Tsuji | G08G 1/167 |
| 2020/0231181 A1 | 7/2020 | Miyahara et al. | |
| 2020/0282990 A1 | 9/2020 | Sato | |
| 2020/0290615 A1 * | 9/2020 | Kato | B60W 40/04 |
| 2020/0361463 A1 | 11/2020 | Hirano | |
| 2021/0016804 A1 | 1/2021 | Hara et al. | |
| 2021/0039638 A1 * | 2/2021 | Yasui | B60W 60/0017 |
| 2021/0070293 A1 * | 3/2021 | Arai | B60W 10/06 |
| 2022/0212679 A1 * | 7/2022 | Winther | G01S 19/01 |

FOREIGN PATENT DOCUMENTS

| | | | | |
|---|---|---|---|---|
| JP | 2005280397 A | * | 10/2005 | ........ B60K 31/0008 |
| JP | 2006315491 A | | 11/2006 | |
| JP | 4172434 B2 | | 10/2008 | |
| JP | 4929777 B2 | | 5/2012 | |
| JP | 2013-123993 A | | 6/2013 | |
| JP | 2013123993 A | * | 6/2013 | |
| JP | 2014148293 A | | 8/2014 | |
| JP | 2018-086874 A | | 6/2018 | |

* cited by examiner

VEHICLE TRAVEL CONTROL APPARATUS

CROSS-REFERENCES TO RELATED APPLICATION

The present application is a continuation application of U.S. patent application Ser. No. 16/816,711 filed on Mar. 12, 2020, which claims the benefit of Japanese Patent Application No. JP 2019-046713 filed on Mar. 14, 2019, the entire contents of both applications are hereby incorporated by reference herein.

BACKGROUND

1. Technical Field

The present disclosure relates to a vehicle travel control apparatus configured to execute following-travel inter-vehicle-distance control (or preceding-vehicle following-travel control).

2. Description of the Related Art

Hitherto, there has been proposed a vehicle travel control apparatus configured to execute following-travel inter-vehicle-distance control of causing a vehicle (own vehicle) to follow a preceding vehicle while maintaining an inter-vehicle distance between the own vehicle and the preceding vehicle at a predetermined distance (see, for example, Japanese Patent Application Laid-open No. 2018-086874). In the following, the above-mentioned control is also referred to as "adaptive cruise control". In addition, the adaptive cruise control is hereinafter simply referred to as "ACC".

A related-art apparatus (first embodiment of Japanese Patent Application Laid-open No. 2018-086874) is configured to execute automatic start control of automatically starting the own vehicle when the preceding vehicle starts after the own vehicle has been stopped by the ACC in response to stopping of the preceding vehicle.

The related-art apparatus measures a stop time, which is a period of time from when the own vehicle stopped in response to the stopping of the preceding vehicle to when the preceding vehicle starts. The related-art apparatus executes the automatic start control when the stop time is within an automatic start permission time. Meanwhile, the related-art apparatus releases (cancels) the automatic start control when the stop time exceeds the automatic start permission time. In this case, the related-art apparatus starts the own vehicle after an operation indicating an intention by the driver to start the vehicle is performed.

The related-art apparatus always starts the own vehicle by the automatic start control when the stop time is within the automatic start permission time. However, as described below, depending on the travel state of the own vehicle, the driver may or may not desire execution of the automatic start control.

For example, when the own vehicle is stopped on a general road in an urban area, the driver may not desire the automatic start control to be executed in consideration of a possibility that a pedestrian may enter ahead of the own vehicle.

As another example, when the own vehicle is stopped on a limited-access road (limited highway), there is a high probability that the limited-access road is congested. In such a situation, many drivers may desire the automatic start control to be executed. However, some drivers may desire to start the own vehicle by their own driving operation.

SUMMARY

The present disclosure provides a vehicle travel control apparatus capable of determining whether or not to execute automatic start control in accordance with the desire of a driver by issuing an inquiry to the driver about whether or not the driver desires the automatic start control to be executed when it is determined that a travel state of an own vehicle is a state in which there is a high probability that the driver desires the automatic start control to be executed.

According to one or more embodiments, there is provided a vehicle travel control apparatus including: an information acquisition device configured to acquire vehicle peripheral information including object information on an object existing around an own vehicle; a vehicle controller configured to execute, based on the vehicle peripheral information, following-travel inter-vehicle-distance control of causing the own vehicle to follow a preceding vehicle traveling immediately ahead of the own vehicle while maintaining an inter-vehicle distance between the own vehicle and the preceding vehicle at a predetermined distance, and to execute automatic start control of causing the own vehicle to automatically start when the preceding vehicle starts after the own vehicle has been stopped by the following-travel inter-vehicle-distance control in response to stopping of the preceding vehicle; a notification device configured to issue to a driver a notification for inquiring whether the driver desires the automatic start control to be executed; and an operation device to be operated by the driver in order to perform a predetermined response operation in response to the notification. The vehicle controller is configured to set an operation mode of the automatic start control to any one of a first mode, in which the automatic start control is executed, and a second mode, in which the automatic start control is inhibited from being executed. The vehicle controller is further configured to, when the own vehicle has stopped in response to the stopping of the preceding vehicle during execution of the following-travel inter-vehicle-distance control and when the operation mode is set to the second mode, determine, based on the vehicle peripheral information, whether a current travel state of the own vehicle is a specific state, in which there is a high probability that the driver desires the automatic start control to be executed, and cause the notification device to issue the notification when it is determined that the travel state is the specific state. The vehicle controller is further configured to set the operation mode to the first mode when the driver has performed the response operation, and set the operation mode to the second mode when the driver has not performed the response operation.

Thus, the vehicle travel control apparatus is configured to determine whether or not the current travel state of the own vehicle is the specific state, in which there is a high probability that the driver desires the automatic start control to be executed. When it is determined that the current travel state of the own vehicle is the specific state, the vehicle travel control apparatus issues an inquiry to the driver about whether or not the driver desires the automatic start control to be executed. Therefore, the vehicle travel control apparatus can issue, in accordance with the current travel state of the own vehicle, an inquiry to the driver about whether or not the driver desires the automatic start control to be executed.

Further, when the driver performs the response operation in response to the inquiry, the vehicle travel control apparatus sets the operation mode of the automatic start control to the first mode. Therefore, when the preceding vehicle starts, the automatic start control is executed in response to the starting of the preceding vehicle. In contrast, when the driver has not performed the response operation in response to the inquiry, the vehicle travel control apparatus sets the operation mode of the automatic start control to the second mode. Thus, the vehicle travel control apparatus can determine whether or not to execute the automatic start control in accordance with the desire of the driver by issuing the inquiry to the driver about whether or not the driver desires the automatic start control to be executed.

In one or more embodiments, the vehicle controller is configured to, when the operation mode is set to the first mode: maintain the operation mode in the first mode until a predetermined finish condition is satisfied; and change the operation mode from the first mode to the second mode when the predetermined finish condition is satisfied.

According to this configuration, when the driver once performs the response operation in response to the inquiry (that is, when the operation mode is set to the first mode), the operation mode of the automatic start control is maintained in the first mode until the finish condition is satisfied. Therefore, the automatic start control is executed each time the own vehicle stops in response to the stopping of the preceding vehicle until the finish condition is satisfied. The driver is not required to perform the response operation each time the own vehicle stops. Therefore, the convenience of the driver is improved.

In one or more embodiments, the information acquisition device is configured to further acquire, as the vehicle peripheral information, road information, which is information on a type of a road on which the own vehicle is traveling. Further, the vehicle controller is configured to: determine, based on the vehicle peripheral information, whether a first specific state condition, which is satisfied when the own vehicle is traveling on a limited-access road, is satisfied; and determine, when it is determined that at least the first specific state condition is satisfied, that the travel state is the specific state.

In a case in which the own vehicle is stopped on a limited-access road, there is a high probability that the limited-access road is congested. In such a situation, the likelihood that the driver desires the automatic start control to be executed is high. The vehicle controller can determine such a situation to be the specific state, and issue an inquiry to the driver about execution of the automatic start control.

In one or more embodiments, the information acquisition device is configured to further acquire, as the vehicle peripheral information, road information, which is information on a type of a road on which the own vehicle is traveling. Further, the vehicle controller is configured to: determine, based on the vehicle peripheral information, whether a second specific state condition, which is satisfied when the own vehicle is traveling on a general road and a predetermined moving object does not exist around the own vehicle, is satisfied; and determine, when it is determined that at least the second specific state condition is satisfied, that the travel state is the specific state.

In a case in which the own vehicle is stopped on a general road, the driver may not desire the automatic start control to be executed when a predetermined moving object (e.g., a pedestrian and/or a two-wheeled vehicle) exists around the vehicle. In contrast, when the predetermined moving object does not exist around the vehicle, there is a high possibility that the driver desires the automatic start control to be executed. Therefore, the vehicle controller determines that the current travel state of the own vehicle is the specific state when the own vehicle is traveling on a general road and the predetermined moving object does not exist around the own vehicle. The vehicle controller can issue an inquiry to the driver about execution of the automatic start control in a situation in which it is considered that the driver desires the automatic start control to be executed even when the own vehicle is traveling on a general road.

In one or more embodiments, the vehicle controller is configured to: determine, based on the vehicle peripheral information, whether a traffic-congestion condition, which is satisfied when the own vehicle is traveling in a traffic-congestion section, is satisfied; and determine, when it is determined that the traffic-congestion condition is satisfied in addition to the first specific state condition or the second specific state condition, that the travel state is the specific state.

It is considered that, when the own vehicle is traveling in a traffic-congestion section, there is a high likelihood that the driver desires the automatic start control to be executed. In such a situation, the vehicle controller can issue an inquiry to the driver about execution of the automatic start control.

According to one or more embodiments, the above-mentioned vehicle controller is implemented by a microprocessor programmed for performing one or more operations and/or functionality described herein. In addition, the vehicle controller may be implemented, in whole or in part, by specifically configured to hardware (e.g., by one or more application specific integrated circuits or ASIC(s)).

In the above description, in order to facilitate understanding of the present disclosure, names and/or reference symbols used in at least one embodiment described later are enclosed in parentheses and are assigned to each of the constituent features corresponding to the at least one embodiment. However, each of the constituent features is not limited to the at least one embodiment defined by the reference symbols.

DESCRIPTION OF THE EMBODIMENTS

Now, referring to the accompanying drawings, a description is given of at least one embodiment.

<Configuration>

A vehicle travel control apparatus according to at least one embodiment (hereinafter sometimes simply referred to as "control apparatus") is applied to a vehicle. The vehicle to which the control apparatus is applied is sometimes referred to as "own vehicle" so as to be distinguished from other vehicles.

Figure 1:
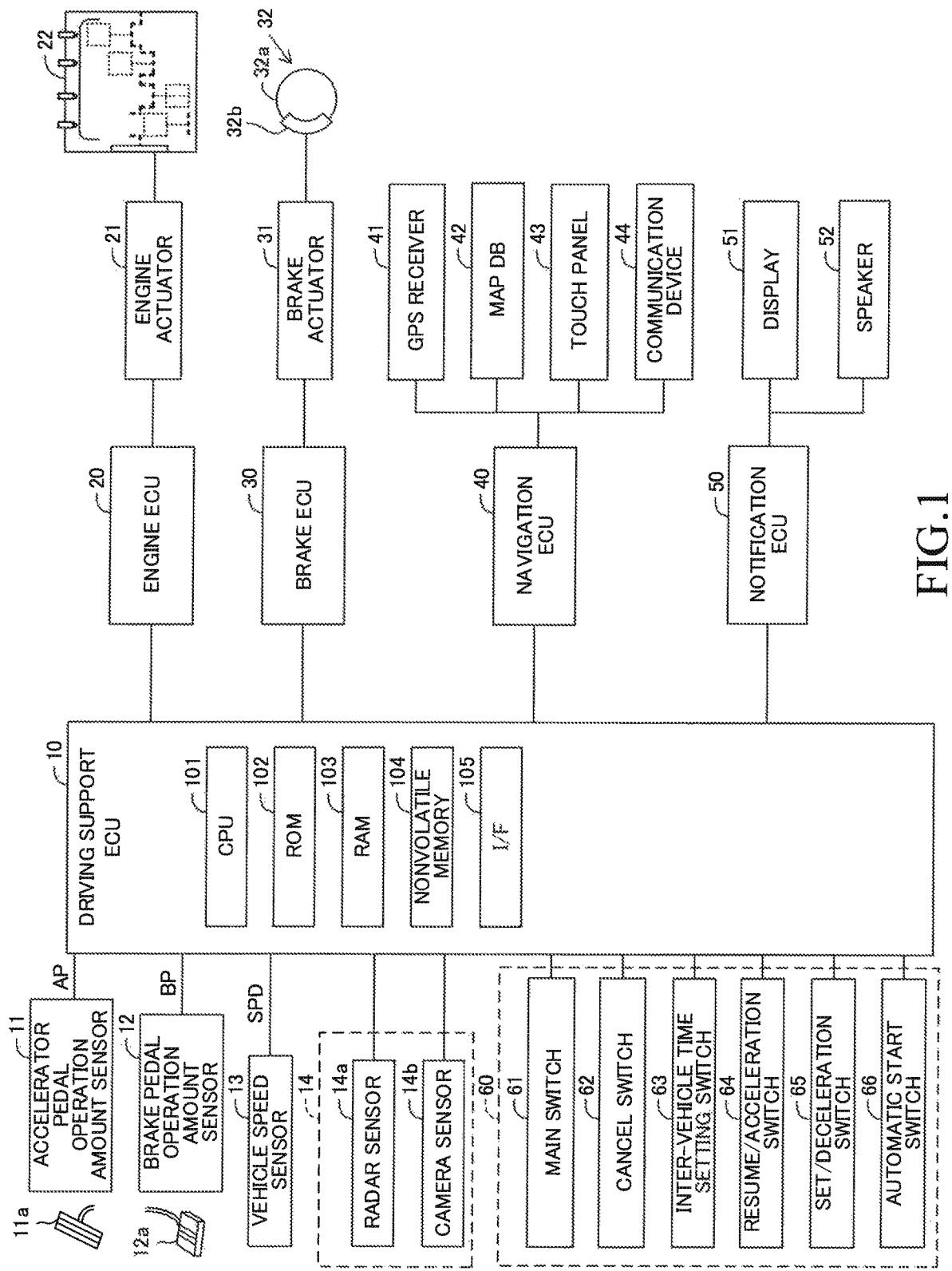
FIG. 1 is a schematic configuration diagram of a vehicle travel control apparatus according to at least one embodiment of the present disclosure.

As illustrated in FIG. 1, the control apparatus includes a driving support ECU (vehicle controller) 10, an engine ECU 20, a brake ECU 30, a navigation ECU 40, and a notification ECU 50. Those ECUs are electric control units each including a microcomputer as a main part, and are connected to one another so as to be able to mutually transmit and receive information via a controller area network (CAN) (not shown).

The microcomputer herein includes a CPU, a ROM, a RAM, a readable and writable nonvolatile memory, an interface I/F, and the like. For example, the driving support ECU 10 includes a CPU 101, a ROM 102, a RAM 103, a nonvolatile memory 104, an interface 105, and the like. The CPU is configured to execute instructions (programs and routines) stored in the ROM to implement various functions.

The driving support ECU 10 is connected to sensors (including switches) listed below, and is configured to receive detection signals or output signals from those sensors. Alternatively, each sensor may be connected to an ECU other than the driving support ECU 10. In this case, the driving support ECU 10 receives the detection signal or the output signal of the sensor from the ECU to which the sensor is connected via the CAN.

An accelerator pedal operation amount sensor 11 is configured to detect an operation amount (accelerator opening degree) of an accelerator pedal 11a, and output a signal representing an accelerator pedal operation amount AP.

A brake pedal operation amount sensor 12 is configured to detect an operation amount of a brake pedal 12a, and output a signal representing a brake pedal operation amount BP.

A vehicle speed sensor 13 is configured to detect a travel speed (vehicle speed) of the vehicle, and output a signal representing a vehicle speed SPD.

An ambient sensor 14 is configured to acquire information on a road around the vehicle (e.g., a travel lane along which the vehicle is traveling and an adjacent lane adjacent to the travel lane) and information on three-dimensional (3D) objects existing on the road. The 3D object means a moving object, for example, a motor vehicle, a pedestrian, and a bicycle, or a fixed object, for example, a guard rail and a fence. Those 3D objects are hereinafter also referred to as "objects". The ambient sensor 14 includes a radar sensor 14a and a camera sensor 14b.

The radar sensor 14a is configured to radiate, for example, a radio wave in a millimeter wave band (hereinafter referred to as "millimeter wave") to a peripheral region of the vehicle, and to receive a millimeter wave (namely, a reflected wave) reflected by an object existing in the radiation range. The peripheral region of the vehicle includes at least a region directly in front of the vehicle, a region in the front-right direction of the vehicle, and a region in the front-left direction of the vehicle. Further, the radar sensor 14a is configured to determine whether or not an object exists by using a relationship between the transmitted millimeter wave and the received reflected wave, and calculate "information on the relative relationship between the vehicle and the object" to output a determination result and a calculation result. The information on the relative relationship between the vehicle and the object includes a distance between the vehicle and the object, an orientation (or position) of the object with respect to the vehicle, a relative speed between the vehicle and the object, and other such information.

More specifically, the radar sensor 14a includes a millimeter wave transmission/reception device and a signal processing device. The signal processing device obtains, each time a predetermined period elapses, the information on the relative relationship between the vehicle and the object based on a phase difference between the millimeter wave transmitted from the millimeter wave transmission/reception device and a reflected wave received by the millimeter wave transmission/reception device, an attenuation level of the reflected wave, a period of time from the transmission of the millimeter wave to the reception of the reflected wave, and other such information. The information includes, as described below, "longitudinal distance Dfx(n), relative speed Vfx(n), lateral distance Dfy(n), relative lateral speed Vfy(n), and other such information" with respect to each detected object(n).

The longitudinal distance Dfx(n) is the distance between the own vehicle and an object(n) (e.g., a preceding vehicle) along a center axis (an axis extending in a front-rear direction) of the own vehicle. When the object(n) is a preceding vehicle, the longitudinal distance Dfx(n) is the inter-vehicle distance between the own vehicle and the preceding vehicle.

The relative speed Vfx(n) is a difference(=Vs−SPD) between a speed Vs of the object(n) (e.g., the preceding vehicle) and the vehicle speed SPD of the own vehicle. The speed Vs of the object(n) is a speed of the object(n) in a travel direction of the own vehicle.

The lateral distance Dfy(n) is a distance of a "center position of the object(n) (e.g., a center position of a vehicle width of the preceding vehicle)" from the center axis of the own vehicle in a direction orthogonal to the center axis.

The relative lateral speed Vfy(n) is a speed of the center position of the object(n) (e.g., the center position of the vehicle width of the preceding vehicle) in the direction orthogonal to the center axis of the own vehicle.

The camera sensor 14b includes a camera and an image processor. The camera is a monocular camera or a stereo camera. The camera takes images of scenes forward of the vehicle to acquire image data each time a predetermined period elapses. The image processor is configured to determine whether or not an object exists based on the taken image data, and calculate information on the relative relationship between the vehicle and the object to output a determination result and a calculation result.

The driving support ECU 10 is configured to combine the "information on the relative relationship between the vehicle and the object" obtained by the radar sensor 14a and the "information on the relative relationship between the vehicle and the object" obtained by the camera sensor 14b with each other, to thereby determine "information on the relative relationship between the vehicle and the object" each time a predetermined period elapses.

Further, the camera sensor 14b is configured to identify (determine) the type of the detected object based on the image data. Examples of types of objects include four-wheeled vehicles, two-wheeled vehicles, and pedestrians. The image processor stores data obtained by patterning an object such as a four-wheeled vehicle, a two-wheeled vehicle, or a pedestrian in a memory in advance. The image processor in this example identifies whether the object corresponds to a four-wheeled vehicle, a two-wheeled vehicle, or a pedestrian by performing pattern matching on the image data.

The information on the object acquired by the ambient sensor 14 (including the information on the relative relationship between the vehicle and the object, and the type of the object) is referred to as "object information". The ambient sensor 14 repeatedly transmits the object information to the driving support ECU 10 each time a predetermined time elapses.

The engine ECU 20 is connected to an engine actuator 21. The engine actuator 21 includes a throttle valve actuator configured to change an opening degree of a throttle valve of an internal combustion engine 22. The engine ECU 20 can drive the engine actuator 21 to change a torque generated by the internal combustion engine 22. The torque generated by the internal combustion engine 22 is transmitted to drive wheels (not shown) via a transmission (not shown). Thus, the engine ECU 20 can control the engine actuator 21 to control a driving force of the vehicle, to thereby change an acceleration state (acceleration).

When the vehicle is a hybrid vehicle, the engine ECU 20 can control a driving force of the vehicle generated by any one of or both of "internal combustion engine and electric motor" serving as vehicle driving sources. When the vehicle is an electric vehicle, the engine ECU 20 can control a driving force of the vehicle generated by an electric motor serving as a vehicle driving source.

The brake ECU 30 is connected to a brake actuator 31. The brake actuator 31 is provided in a hydraulic circuit (not shown) between a master cylinder configured to pressurize a working fluid with a stepping force on a brake pedal 12a and friction brake mechanisms 32 provided on the front/rear left/right wheels. The brake actuator 31 adjusts a hydraulic pressure of the working fluid to be supplied to a wheel cylinder integrated into a brake caliper 32b of the friction brake mechanism 32 in accordance with an instruction from the brake ECU 30. With the wheel cylinder being operated by the hydraulic pressure, a brake pad is pressed against a brake disc 32a to generate a friction braking force. Thus, the brake ECU 30 can control the brake actuator 31 to control the braking force of the vehicle and change an acceleration state (a deceleration, namely, a negative acceleration) of the vehicle.

The navigation ECU 40 includes a GPS receiver 41 configured to receive a GPS signal for detecting the "latitude and longitude" of the place at which the vehicle is positioned, a map database (DB) 42 configured to store map information, a touch panel 43, and a communication device 44.

The map information stored in the map DB 42 includes road information. The road information includes road parameters for each road section. For example, in the road information, a road type, a road width, a road curvature, a road gradient, and the like are associated with each road section. In this example, the road type is any one of a limited-access road (highway) and a general road. The navigation ECU 40 repeatedly transmits the road information on the road on which the vehicle is traveling to the driving support ECU 10 each time a predetermined time elapses.

The touch panel 43 is a touch panel type display, and can display a map, an image, and the like. The navigation ECU 40 performs various arithmetic processes based on the latitude and longitude of the place at which the vehicle is positioned, the map information, and the like, and displays on the touch panel 43 the position of the vehicle on the map.

The communication device 44 is configured to communicate to and from an information center (information providing facility). For example, the communication device 44 receives road traffic information from the Vehicle Information and Communication System (VICS) (trademark). The road traffic information includes, for example, information on a traffic-congestion section and information on a closed road section.

The notification ECU 50 is connected to a display 51 and a speaker 52. The display 51 is a multi-information display arranged in front of the driver's seat. The display 51 is configured to display various types of information in addition to display of measurement values such as the vehicle speed SPD and the engine rotation speed. A head-up display may be employed as the display 51. When the speaker 52 receives a sound command from the driving support ECU 10 via the notification ECU 50, the speaker 52 generates a sound corresponding to the sound command. The "display 51 and speaker 52" may be collectively referred to as a "notification device".

A steering wheel (not shown) of the vehicle includes an operation device 60 for performing an operation relating to ACC. The operation device 60 is arranged at a position facing the driver and operable by the driver. The operation device 60 includes a main switch 61, a cancel switch 62, an inter-vehicle time setting switch 63, a resume/acceleration switch 64, a set/deceleration switch 65, and an automatic start switch 66. Details of the method of operating those switches 61 to 66 are described later.

(Overview of ACC)

The driving support ECU 10 can execute the ACC. The ACC itself is widely known (see, for example, Japanese Patent Application Laid-open No. 2014-148293, Japanese Patent Application Laid-open No. 2006-315491, Japanese Patent No. 4172434, and Japanese Patent No. 4929777). In addition, the ACC may be also referred to as "following-travel inter-vehicle-distance control (or preceding-vehicle following-travel control)".

The ACC includes two types of control, namely, following-travel-mode control and constant-speed-travel-mode control. The following-travel-mode control is control of causing the own vehicle to follow a preceding vehicle traveling immediately ahead of the own vehicle while maintaining an inter-vehicle distance between the own vehicle and the preceding vehicle at a predetermined distance, without requiring operation of the accelerator pedal 11a and the brake pedal 12a. The constant-speed-travel-mode control is control of causing the vehicle to travel such that the travel speed of the vehicle matches a target speed (set speed Vset) without requiring operation of the accelerator pedal 11a and the brake pedal 12a.

In the following description (routines of FIG. 2 to FIG. 4), it is assumed that the control apparatus is executing the following-travel-mode control. Therefore, the following-travel-mode control is mainly described.

When the ACC is started (when the main switch 61 is turned on as described later), the driving support ECU 10 determines, based on the object information acquired by the ambient sensor 14, whether or not there is a vehicle (that is, a following target vehicle) traveling ahead (immediately ahead) of the own vehicle and that is to be followed by the own vehicle. For example, the driving support ECU 10 determines whether or not the relative position of the object(n) identified from the lateral distance Dfy(n) and longitudinal distance Dfx(n) of the detected object(n) exists in a following-target-vehicle area determined in advance. The following-target-vehicle area is an area defined in advance so that an absolute value of a distance in a lateral direction with respect to the travel direction of the own vehicle decreases as a distance in the travel direction increases.

The driving support ECU 10 selects the object(n) as the following target vehicle (a) when the object(n) exists in the following-target-vehicle area for a predetermined period or longer. Then, the driving support ECU 10 executes the following-travel-mode control. When there are a plurality of objects for which the relative position exists in the following-target-vehicle area for the predetermined period or longer, the driving support ECU 10 selects an object having the shortest longitudinal distance (inter-vehicle distance) Dfx(n) from among those objects as the following target vehicle (a).

The driving support ECU 10 calculates a target acceleration Gtgt in accordance with any one of Expression (1) and Expression (2) given below. In Expression (1) and Expression (2), Vfx(a) represents a relative speed of the following target vehicle (a), k1 and k2 represent predetermined positive gains (coefficients), and ΔD1 represents an inter-vehicle distance difference(=Dfx(a)−Dtgt) obtained by subtracting a "target inter-vehicle distance Dtgt" from a "longitudinal distance (inter-vehicle distance) Dfx(a) of the following target vehicle (a)". The target inter-vehicle distance Dtgt is calculated by multiplying a target inter-vehicle period Ttgt set by using the inter-vehicle time setting switch 63 by the vehicle speed SPD of the own vehicle (that is, Dtgt=Ttgt·SPD). However, when the vehicle speed SPD of the own vehicle is equal to or less than a predetermined vehicle speed (low vehicle speed) threshold value SPDLth, the target inter-vehicle distance Dtgt is set to a constant distance Dp determined in advance.

The driving support ECU 10 uses Expression (1) given below to determine the target acceleration Gtgt when the value (k1·ΔD1+k2·Vfx(a)) is positive or "0". The value ka1 represents a positive gain (coefficient) for acceleration, and is set to a value equal to or smaller than "1".

The driving support ECU 10 uses Expression (2) given below to determine the target acceleration Gtgt when the value (k1·ΔD1+k2·Vfx(a)) is negative. The value kd1 represents a positive gain (coefficient) for deceleration, and is set to "1" in this example.

$$Gtgt \text{ (for acceleration)}=ka1\cdot(k1\cdot\Delta D1+k2\cdot Vfx(a)) \quad (1)$$

$$Gtgt \text{ (for deceleration)}=kd1\cdot(k1\cdot\Delta D1+k2\cdot Vfx(a)) \quad (2)$$

The driving support ECU 10 uses the engine ECU 20 to control the engine actuator 21 to control the driving force of the vehicle, and, as required, uses the brake ECU 30 to control the brake actuator 31 to control the braking force of the vehicle so that the acceleration of the vehicle matches the target acceleration Gtgt.

The driving support ECU 10 can also execute the automatic start control during execution of the following-travel-mode control. The automatic start control is control of causing the own vehicle to automatically start without requiring a predetermined operation (any one of operation 1 and operation 2 described later) by the driver when the following target vehicle (a) starts after the own vehicle has stopped in response to the following target vehicle (a) having stopped.

The driving support ECU 10 sets the operation mode of the automatic start control to any one of an ON mode (first mode), in which the automatic start control is executed, and an OFF mode (second mode), in which the automatic start control is not executed.

In a case in which the driving support ECU 10 is executing the following-travel-mode control, when the following target vehicle (a) stops, the driving support ECU 10 causes the own vehicle to stop in response to the stopping of the following target vehicle (a). It is assumed that the operation mode of the automatic start control is in the ON mode in a situation in which the own vehicle is stopped immediately behind the following target vehicle (a). In this case, when the following target vehicle (a) starts, the driving support ECU 10 executes the automatic start control. Then, the driving support ECU 10 continues the following-travel-mode control.

Next, it is assumed that the operation mode of the automatic start control is in the OFF mode in a situation in which the own vehicle is stopped immediately behind the following target vehicle (a). In this case, when the following target vehicle (a) starts, the driving support ECU 10 maintains the own vehicle in a stopped state without executing the automatic start control. When the driver performs a predetermined operation in a situation in which the own vehicle is thus maintained to be stopped, the driving support ECU 10 starts the vehicle. Then, the driving support ECU 10 continues the following-travel-mode control. The predetermined operation is any one of the following operation 1 and operation 2.

(Operation 1) The driver presses the resume switch 64.

(Operation 2) The driver steps on the accelerator pedal 11a (that is, the accelerator pedal operation amount AP changes from "0" to a "value greater than 0").

The driving support ECU 10 determines that there is no following target vehicle when an object(n) does not exist in the following-target-vehicle area. In this case, the driving support ECU 10 executes the constant-speed-travel-mode control. Specifically, the driving support ECU 10 determines the target acceleration Gtgt based on the set speed Vset and the vehicle speed SPD such that the vehicle speed SPD of the vehicle matches the set speed Vset. The driving support ECU 10 sets the target acceleration Gtgt to "0" when the set speed Vset matches the vehicle speed SPD. When the set speed Vset is higher than the vehicle speed SPD, the driving support ECU 10 increases the target acceleration Gtgt. When the set speed Vset is lower than the vehicle speed SPD, the driving support ECU 10 decreases the target acceleration Gtgt. The driving support ECU 10 controls the engine actuator 21 by using the engine ECU 20 to control the driving force of the vehicle, and controls the brake actuator 31 as required by using the brake ECU 30 to control the braking force of the vehicle such that the acceleration of the vehicle matches the target acceleration Gtgt.

(Method of Operating Operation Device)

Next, a detailed method of operating the switches 61 to 66 of the operation device 60 is described.

The main switch 61 is a switch to be operated by the driver when the ACC is started or finished. Each time the main switch 61 is pressed, the state of the main switch 61 alternates between an ON state and an OFF state. When the main switch 61 is switched from the OFF state to the ON state, the driving support ECU 10 starts the ACC. Meanwhile, when the main switch 61 is switched from the ON state to the OFF state, the driving support ECU 10 finishes the ACC.

The cancel switch 62 is a switch to be operated by the driver when the ACC is temporarily stopped (temporarily canceled). Each time the cancel switch 62 is pressed, the state of the cancel switch 62 alternates between an ON state and an OFF state. When the cancel switch 62 is switched to the ON state in a situation in which the main switch 61 is in the ON state (during execution of the ACC), the driving support ECU 10 temporarily stops the ACC.

The inter-vehicle time setting switch 63 is a switch to be operated by the driver when the target inter-vehicle time Ttgt in the following-travel-mode control is set. The driver can select one of the three levels of time (long, medium, and short) as the target inter-vehicle time Ttgt.

The resume/acceleration switch 64 is a switch to be operated by the driver when the ACC is resumed after the ACC is temporarily stopped. The resume/acceleration switch 64 is hereinafter simply referred to as "resume switch 64". The resume switch 64 is in an ON state when the resume switch 64 has been pressed by the driver, and is in an OFF state when the resume switch 64 has not been pressed by the driver. When the resume switch 64 is changed from the OFF state to the ON state in a situation in which the main switch 61 is in the ON state and the cancel switch 62 is in the ON state (that is, a situation in which the ACC is temporarily stopped), the driving support ECU 10 resumes the ACC. When the ACC is resumed, the driving support ECU 10 changes the state of the cancel switch 62 to the OFF state.

In a case in which there is a following target vehicle when the ACC is resumed, the driving support ECU 10 resumes following-travel-mode control. In contrast, in a case in which there is no following target vehicle when the ACC is resumed, the driving support ECU 10 resumes the constant-speed-travel-mode control by using the set speed Vset at the time when the ACC was temporarily stopped.

As described above, the resume switch 64 is also operated when the vehicle is started in a case in which the own vehicle has stopped immediately behind the following target vehicle (a) during following-travel-mode control.

Further, the resume switch 64 is also a switch to be operated by the driver when the set speed Vset is increased. Therefore, in a case in which the constant-speed-travel-mode control is being executed, when the resume switch 64 is switched to the ON state, the driving support ECU 10 increases the set speed Vset by a predetermined speed change amount.

The set/deceleration switch 65 is a switch to be operated by the driver when the set speed Vset is set. The set/deceleration switch 65 is hereinafter simply referred to as "set switch 65". The set switch 65 is in an ON state when the set switch 65 has been pressed by the driver, and is in an OFF state when the set switch 65 has not been pressed by the driver. When the set switch 65 is changed from the OFF state to the ON state after the ACC is started, the driving support ECU 10 sets the set speed Vset to "the vehicle speed SPD at the time when the set switch 65 was switched to the ON state (that is, at the time when the driver pressed the set switch 65)".

Further, the set switch 65 is also a switch to be operated by the driver when the set speed Vset is decreased. In a case in which the constant-speed-travel-mode control is being executed, when the set switch 65 is switched to the ON state, the driving support ECU 10 decreases the set speed Vset by a predetermined speed change amount.

As described later, the automatic start switch 66 is a switch to be operated by the driver when a response operation (approval operation) is performed in response to an inquiry as to whether or not to execute the automatic start control. The automatic start switch 66 is in an ON state when the automatic start switch 66 has been pressed by the driver, and is in an OFF state when the automatic start switch 66 has not been pressed by the driver. In the case in which the inquiry has been performed, when the automatic start switch 66 is in the ON state, the driving support ECU 10 determines that the driver has performed the response operation in response to the inquiry (that is, determines that the driver desires the automatic start control to be executed).

In a case in which the driver performs a specific cancel operation (e.g., two consecutive pressing operations within a predetermined time) on the automatic start switch 66 when the operation mode of the automatic start control is in the ON mode, the operation mode of the automatic start control can be changed to the OFF mode.

(Overview of Operation)

As described above, depending on the travel state of the own vehicle, the driver may or may not desire the automatic start control to be executed. Therefore, when the own vehicle has stopped in response to the stopping of the following target vehicle during execution of the ACC and the operation mode of the automatic start control is set to the OFF mode, the control apparatus according to the present embodiment determines whether or not the current travel state of the own vehicle is a state in which there is a high probability that the driver desires the automatic start control to be executed (hereinafter referred to as "specific state").

For example, when the own vehicle is traveling on a limited-access road, the control apparatus determines that the current travel state of the own vehicle is the specific state. As another example, when the own vehicle is traveling on a general road and there are no moving objects (pedestrians or two-wheeled vehicles) around the own vehicle, the control apparatus determines that the current travel state of the own vehicle is the specific state. When it is determined that the current travel state of the own vehicle is the specific state, the control apparatus causes the notification device (the display 51 and the speaker 52) to issue a notification for inquiring whether or not the driver desires the automatic start control to be executed.

Even when the above-mentioned inquiry is performed, some drivers desire to start the own vehicle by performing a driving operation themselves. Therefore, the control apparatus determines whether or not the driver has performed the response operation by operating the automatic start switch 66 in response to the inquiry.

When the driver has performed the response operation, the control apparatus sets the operation mode of the automatic start control to the ON mode. In contrast, when the driver has not performed the response operation, the control apparatus sets the operation mode of the automatic start control to the OFF mode. Thus, the control apparatus can determine whether to execute the automatic start control in accordance with the desire of the driver.

(Operation)

The CPU 101 of the driving support ECU 10 (hereinafter simply referred to as "CPU") is configured to execute the routine illustrated in FIG. 2 each time a predetermined time elapses.

The CPU acquires the object information from the ambient sensor 14 and stores the acquired object information in the RAM 103 by executing a routine (not shown) each time a predetermined time elapses. The CPU also acquires the road information (including the road type) from the map DB 42 via the navigation ECU 40 and stores the acquired road information in the RAM 103 by executing a routine (not shown) each time a predetermined time elapses. Information on the periphery of the vehicle including "the object information and the road information" may be referred to as "vehicle peripheral information".

In addition, when starting following-travel-mode control, the CPU executes an initialization routine (not shown), and sets the values of various flags described later to "0" (clears the flags).

Figure 2:
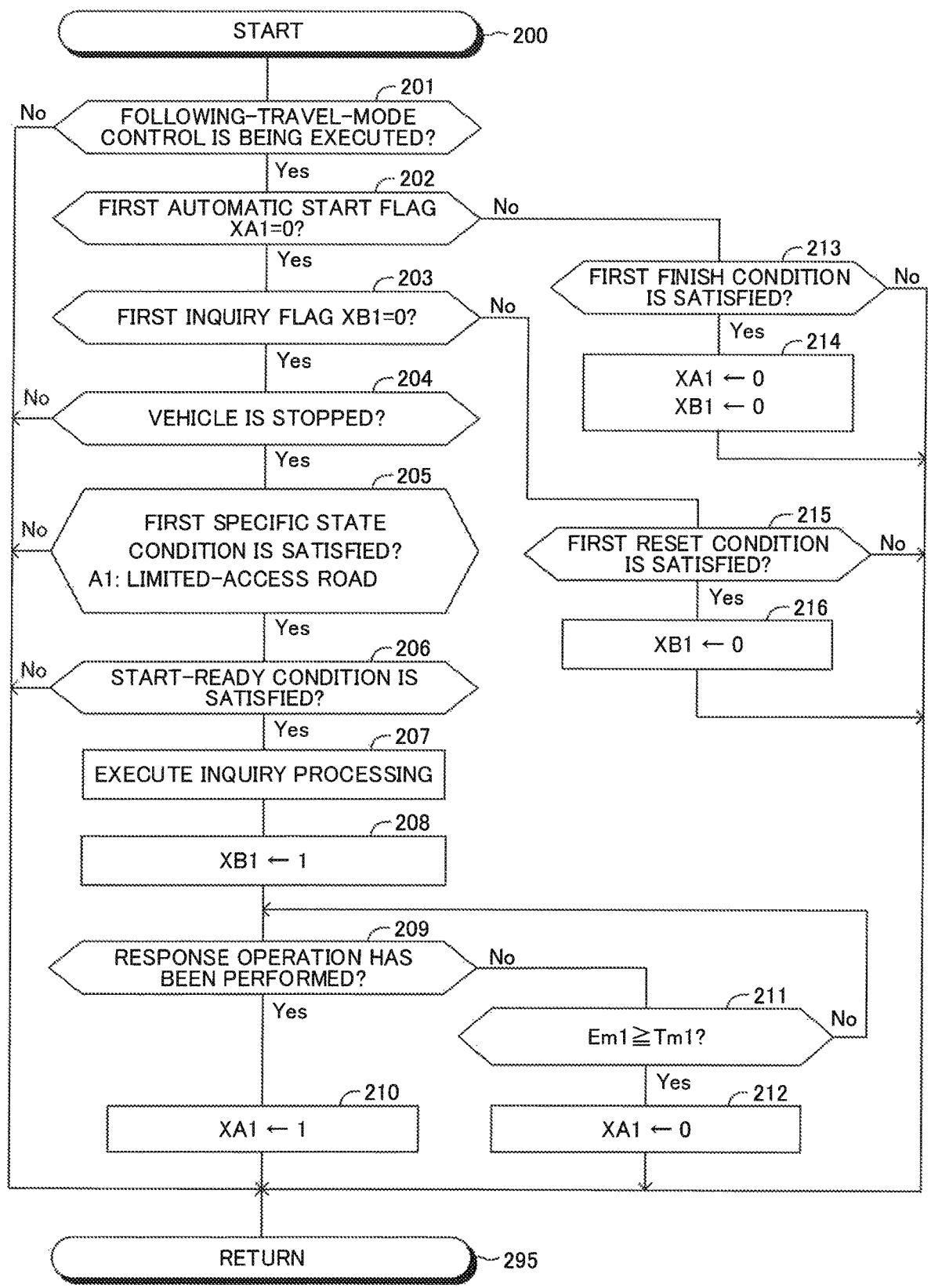
FIG. 2 is a flowchart for illustrating a "first specific state determination routine" to be executed by a CPU of a driving support ECU illustrated in FIG. 1.

When a predetermined timing is reached, the CPU starts the processing from Step 200 of FIG. 2, and proceeds to Step 201 to determine whether or not following-travel-mode control is being executed. When the following-travel-mode control is not being executed, the CPU makes a determination of "No" in Step 201, and directly proceeds to Step 295 to temporarily finish this routine.

In contrast, when the following-travel-mode control is being executed, the CPU makes a determination of "Yes" in Step 201, and proceeds to Step 202 to determine whether or not a first automatic start flag XA1 is "0". When the value of the first automatic start flag XA1 is "0", this indicates that the operation mode of the automatic start control is in the OFF mode in a situation in which the vehicle is traveling on a limited-access road, and when the value is "1", this indicates that the operation mode of the automatic start control is in the ON mode in a situation in which the vehicle is traveling on a limited-access road.

In this case, when it is assumed that the value of the first automatic start flag XA1 is "0", the CPU makes a determination of "Yes" in Step 202, and proceeds to Step 203 to determine whether or not the value of a first inquiry flag XB1 is "0". The value of the first inquiry flag XB1 is set to "1" when the processing of Step 207, which is described later, is executed (that is, when the processing of issuing an inquiry to the driver about whether or not to execute the automatic start control is performed). The value of the first inquiry flag XB1 is set to "0" when any one of "first finish condition and first reset condition" described later is satisfied after the processing of Step 207 is executed.

When the value of the first inquiry flag XB1 is "0", the CPU makes a determination of "Yes" in Step 203, and proceeds to Step 204 to determine whether or not the own vehicle is stopped (that is, whether or not the vehicle speed SPD is zero). When the own vehicle is not stopped, the CPU makes a determination of "No" in Step 204, and directly proceeds to Step 295 to temporarily finish this routine.

When the own vehicle is stopped, the CPU makes a determination of "Yes" in Step 204, and proceeds to Step 205 to determine, based on the vehicle peripheral information, whether or not a predetermined first specific state condition is satisfied. This condition is a condition for determining whether or not the current travel state of the own vehicle is the specific state, in which there is a high probability that the driver desires the automatic start control to be executed. The first specific state condition is satisfied when the following condition A1 is satisfied. The CPU determines whether or not the condition A1 is satisfied based on the road information (including the road type).

(Condition A1): The own vehicle is traveling on a limited-access road (the own vehicle is located on a limited-access road).

When the first specific state condition is not satisfied, the CPU makes a determination of "No" in Step 205, and directly proceeds to Step 295 to temporarily finish this routine.

In contrast, when the first specific state condition is satisfied, the CPU makes a determination of "Yes" in Step 205, and proceeds to Step 206 to determine whether or not a predetermined start-ready condition is satisfied. The start-ready condition is satisfied when the driver is not operating the brake pedal 12a.

When the start-ready condition is not satisfied, this means that the driver is intentionally operating the brake pedal 12a to stop the own vehicle. Therefore, it is considered that the driver desires to drive the vehicle under his or her own operation. Therefore, the CPU makes a determination of "No" in Step 206, and proceeds directly to Step 295 to temporarily finish this routine. In this case, the processing of issuing an inquiry to the driver about whether or not the driver desires the automatic start control to be executed (the processing of Step 207) is not performed.

In contrast, when the start-ready condition is satisfied, the CPU makes a determination of "Yes" in Step 206, and sequentially executes the processing of Step 207 and Step 208 described later. Then, the CPU proceeds to Step 209.

Step 207: The CPU causes the notification device (the display 51 and the speaker 52) to execute processing of issuing an inquiry to the driver about whether or not the driver desires the automatic start control to be executed (hereinafter simply referred to as "inquiry processing"). Specifically, the CPU causes the display 51 to display a message for inquiring whether or not to execute the automatic start control, and causes the speaker 52 to utter the message. Further, the CPU may cause the display 51 to display a message to the effect that the operation mode of the automatic start control can be turned to the ON mode by pressing the automatic start switch 66, and cause the speaker 52 to utter the message. Thus, the CPU can issue an inquiry (propose) to the driver about execution of the automatic start control in accordance with the travel state of the vehicle.

Step 208: The CPU sets the value of the first inquiry flag XB1 to "1".

When the CPU proceeds to Step 209, the CPU determines whether or not the driver has performed the response operation in response to the inquiry processing (whether or not the state of the automatic start switch 66 has been turned on). When the driver has performed the response operation (approval operation) in response to the proposal to execute the automatic start control, this means that the driver desires the automatic start control to be executed. Therefore, the CPU makes a determination of "Yes" in Step 209, and proceeds to Step 210 to set the value of the first automatic start flag XA1 to "1". Specifically, the operation mode of the automatic start control is set to the ON mode. Then, the CPU proceeds to Step 295 to temporarily finish this routine. As a result, the CPU makes a determination of "Yes" in Step 405 of the routine of FIG. 4 described later, and hence the automatic start control is executed.

In contrast, when the response operation has not been performed by the driver (when the state of the automatic start switch 66 remains in the OFF state), the CPU makes a determination of "No" in Step 209, and proceeds to Step 211 to determine whether or not "an elapsed time Em1 from when the inquiry processing is performed in Step 207" is equal to or longer than a predetermined first time threshold value Tm1. When the elapsed time Em1 is less than the first time threshold value Tm1, the CPU makes a determination of "No" in Step 211, and returns to Step 209.

When the elapsed time Em1 is equal to or longer than the first time threshold value Tm1, the CPU considers that the driver has not approved execution of the automatic start control (that is, the driver has turned down execution of the automatic start control). Therefore, the CPU makes a determination of "Yes" in Step 211, and proceeds to Step 212 to set the value of the first automatic start flag XA1 to "0". That is, the operation mode of the automatic start control is set to the OFF mode. Then, the CPU proceeds to Step 295 to temporarily finish this routine. Thus, in a situation in which the own vehicle is traveling on a limited-access road, the CPU makes a determination of "No" in Step 405 of the routine of FIG. 4 described later, and hence the automatic start control is not executed.

Thus, when the CPU restarts the routine of FIG. 2 from Step 200 after the value of the first automatic start flag XA1 has been set to "1" and proceeds to Step 202, the CPU makes a determination of "No" and proceeds to Step 213.

In Step 213, the CPU determines whether or not a predetermined first finish condition is satisfied. The first finish condition is satisfied when any one of the following conditions B1 to B4 is satisfied.

(Condition B1): The vehicle speed SPD of the own vehicle is equal to or higher than a predetermined speed threshold value Vth (e.g., 60 km/h). Specifically, there is a high probability that the traffic congestion of the limited-access road has been eliminated.

(Condition B2): The own vehicle has moved from a limited-access road to a general road.

(Condition B3): The driver has performed the specific cancel operation (e.g., two consecutive pressing operations within a predetermined time) on the automatic start switch 66.

(Condition B4): The driver has changed the state of the main switch 61 to the OFF state by pressing the main switch 61. That is, the driver has finished the ACC.

When the first finish condition is not satisfied, the CPU makes a determination of "No" in Step 213, and directly proceeds to Step 295 to temporarily finish this routine. As a result, the value of the first automatic start flag XA1 is maintained at "1". That is, in a situation in which the own vehicle is traveling on a limited-access road, the operation mode of the automatic start control is maintained in the ON mode. Therefore, the automatic start control is executed each time the own vehicle stops in response to the stopping of the following target vehicle (a) on a limited-access road (see a determination of "Yes" in Step 405 of the routine of FIG. 4).

In contrast, when the first finish condition is satisfied, the CPU makes a determination of "Yes" in Step 213, and proceeds to Step 214 to set the value of the first automatic start flag XA1 to "0". That is, the operation mode of the automatic start control is changed from the ON mode to the OFF mode. Further, the CPU sets the value of the first inquiry flag XB1 to "0". Then, the CPU proceeds to Step 295 to temporarily finish this routine. As a result, in a situation in which the own vehicle is traveling on a limited-access road, the CPU makes a determination of "No" in Step 405 of the routine of FIG. 4 described later, and hence the automatic start control is not executed.

It is assumed that the CPU restarts the routine of FIG. 2 from Step 200 after the value of the first inquiry flag XB1 has been set to "1" and the value of the first automatic start flag XA1 has been set to "0" as described above (Step 208, Step 209: No, Step 211: Yes, and Step 212). When the CPU proceeds to Step 203, the CPU makes a determination of "No", and proceeds to Step 215.

In Step 215, the CPU determines whether or not a predetermined first reset condition is satisfied. The first reset condition is satisfied when any one of the following conditions C1 to C4 is satisfied.

(Condition C1): The vehicle speed SPD of the own vehicle is equal to or higher than a predetermined speed threshold value Vth (e.g., 60 km/h). Specifically, there is a high probability that the traffic congestion of the limited-access road has been eliminated.

(Condition C2): The own vehicle has moved from a limited-access road to a general road.

(Condition C3): An elapsed time Et1 from when the value of the first inquiry flag XB1 became "1" (that is, the time at which the processing of Step 208 was executed) has become equal to or longer than a predetermined second time threshold value Tm2.

(Condition C4): The driver has changed the state of the main switch 61 to the OFF state by pressing the main switch 61. That is, the driver has finished the ACC.

When the first reset condition is not satisfied, the CPU makes a determination of "No" in Step 215, and directly proceeds to Step 295 to temporarily finish this routine. Therefore, the value of the first inquiry flag XB1 is maintained at "1", and hence the CPU makes a determination of "No" in Step 203. Therefore, on a limited-access road, the inquiry processing (processing of Step 207) is not performed at least until the first reset condition is satisfied. For example, in a case in which the own vehicle is traveling in a traffic-congestion section, when the driver has not performed the response operation in response to the inquiry processing (the driver has once turned down execution of the automatic start control), the inquiry processing is not performed until the above-mentioned condition C3 is satisfied. Therefore, the likelihood that the driver is bothered by the inquiry processing can be reduced.

In contrast, when the first reset condition is satisfied, the CPU makes a determination of "Yes" in Step 215, and proceeds to Step 216 to set the value of the first inquiry flag XB1 to "0". Then, the CPU proceeds to Step 295 to temporarily finish this routine.

Figure 3:
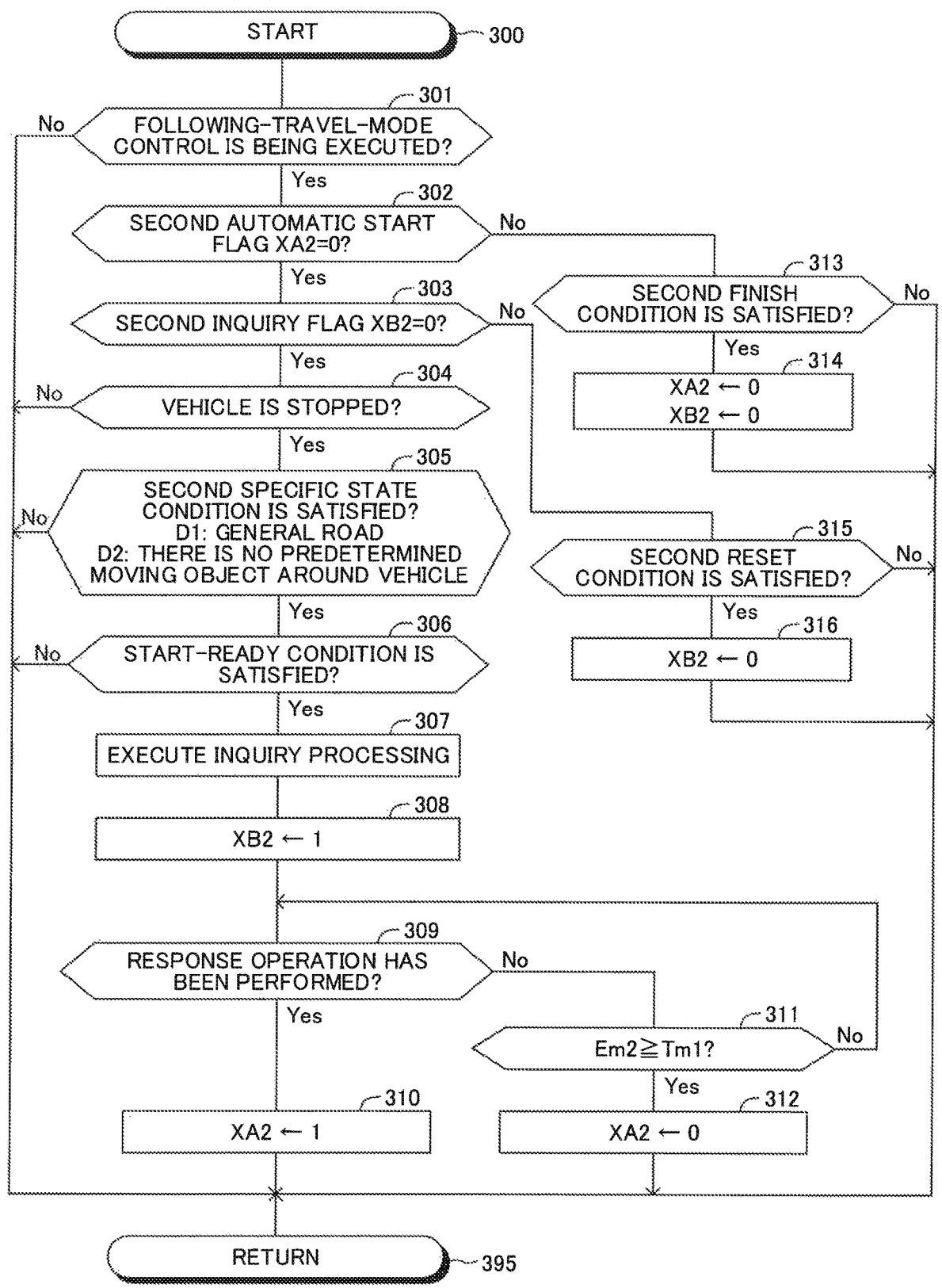
FIG. 3 is a flowchart for illustrating a "second specific state determination routine" to be executed by the CPU of the driving support ECU illustrated in FIG. 1.

The CPU is also configured to execute the routine illustrated in FIG. 3 each time a predetermined time elapses.

When a predetermined timing is reached, the CPU starts the processing from Step 300 of FIG. 3, and proceeds to Step 301 to determine whether or not following-travel-mode control is being executed. When the following-travel-mode control is not being executed, the CPU makes a determination of "No" in Step 301, and directly proceeds to Step 395 to temporarily finish this routine.

In contrast, when the following-travel-mode control is being executed, the CPU makes a determination of "Yes" in Step 301, and proceeds to Step 302 to determine whether or not a second automatic start flag XA2 is "0". When the value of the second automatic start flag XA2 is "0", this indicates that the operation mode of the automatic start control is in the OFF mode in a situation in which the vehicle is traveling on a general road, and when the value is "1", this indicates that the operation mode of the automatic start control is in the ON mode in a situation in which the vehicle is traveling on a general road.

In this case, when it is assumed that the value of the second automatic start flag XA2 is "0", the CPU makes a determination of "Yes" in Step 302, and proceeds to Step 303 to determine whether or not the value of a second inquiry flag XB2 is "0". The value of the second inquiry flag XB2 is set to "1" when the processing of Step 307, which is described later, is executed (that is, when the processing of issuing an inquiry to the driver about whether or not to execute the automatic start control is performed). The value of the second inquiry flag XB2 is set to "0" when any one of "second finish condition and second reset condition" described later is satisfied after the processing of Step 307 is executed.

When the value of the second inquiry flag XB2 is "0", the CPU makes a determination of "Yes" in Step 303, and proceeds to Step 304 to determine whether or not the own vehicle is stopped (that is, whether or not the vehicle speed SPD is zero). When the own vehicle is not stopped, the CPU makes a determination of "No" in Step 304, and directly proceeds to Step 395 to temporarily finish this routine.

When the own vehicle is stopped, the CPU makes a determination of "Yes" in Step 304, and proceeds to Step 305 to determine, based on the vehicle peripheral information, whether or not a predetermined second specific state condition is satisfied. This condition is a condition for determining whether or not the current travel state of the own vehicle is the specific state in which there is a high probability that the driver desires the automatic start control to be executed. The second specific state condition is satisfied when the following conditions D1 and D2 are both satisfied. The CPU determines whether or not the condition D1 is satisfied based on the road information (including the road type). Further, the CPU determines whether or not the condition D2 is satisfied based on the object information (including the type of the object).

(Condition D1): The own vehicle is traveling on a general road (the own vehicle is positioned on a general road).

(Condition D2): A predetermined moving object (pedestrian and/or two-wheeled vehicle) is not detected within a predetermined distance range from the own vehicle.

When the second specific state condition is not satisfied, the CPU makes a determination of "No" in Step 305, and directly proceeds to Step 395 to temporarily finish this routine.

In contrast, when the second specific state condition is satisfied, the CPU makes a determination of "Yes" in Step 305, and proceeds to Step 306 to determine whether or not the above-mentioned start-ready condition is satisfied.

When the start-ready condition is not satisfied, the CPU makes a determination of "No" in Step 306, and directly proceeds to Step 395 to temporarily finish this routine.

In contrast, when the start-ready condition is satisfied, the CPU makes a determination of "Yes" in Step 306, and executes the processing of Step 307 and Step 308 described later in order. Then, the CPU proceeds to Step 309.

Step 307: The CPU causes the notification device (the display 51 and the speaker 52) to execute the inquiry processing as described above.

Step 308: The CPU sets the value of the second inquiry flag XB2 to "1".

When the CPU proceeds to Step 309, the CPU determines whether or not the driver has performed the response operation in response to the inquiry processing (determines whether or not the automatic start switch 66 has become the ON state). When the response operation has been performed by the driver, the CPU makes a determination of "Yes" in Step 309, and proceeds to Step 310 to set the value of the second automatic start flag XA2 to "1". Specifically, the operation mode of the automatic start control is set to the ON mode. Then, the CPU proceeds to Step 395 to temporarily finish this routine. As a result, the CPU makes a determination of "Yes" in Step 405 of the routine of FIG. 4 described later, and hence the automatic start control is executed.

In contrast, when the response operation has not been performed by the driver (the automatic start switch 66 remains in the OFF state), the CPU makes a determination of "No" in Step 309, and proceeds to Step 311 to determine whether or not "an elapsed time Em2 from when the inquiry processing is performed in Step 307" is equal to or longer than the first time threshold value Tm1. When the elapsed time Em2 is less than the first time threshold value Tm1, the CPU makes a determination of "No" in Step 311, and returns to Step 309.

When the elapsed time Em2 is equal to or longer than the first time threshold value Tm1, the CPU makes a determination of "Yes" in Step 311, and proceeds to Step 312 to set the value of the second automatic start flag XA2 to "0". That is, the operation mode of the automatic start control is set to the OFF mode. Then, the CPU proceeds to Step 395 to temporarily finish this routine. Thus, in a situation in which the own vehicle is traveling on a general road, the CPU makes a determination of "No" in Step 405 of the routine of FIG. 4 described later, and hence the automatic start control is not executed.

Thus, when the CPU restarts the routine of FIG. 3 from Step 300 after the value of the second automatic start flag XA2 has been set to "1" and proceeds to Step 302, the CPU makes a determination of "No" and proceeds to Step 313.

In Step 313, the CPU determines whether or not a predetermined second finish condition is satisfied. The second finish condition is satisfied when any one of the following conditions E1 to E4 is satisfied.

(Condition E1): In a situation in which the own vehicle is stopped, a predetermined moving object (pedestrian and/or two-wheeled vehicle) is detected within a predetermined distance range from the own vehicle.

(Condition E2): The own vehicle has moved from a general road to a limited-access road.

(Condition E3): The driver has performed the specific cancel operation (e.g., two consecutive pressing operations within a predetermined time) on the automatic start switch 66.

(Condition E4): The driver has changed the state of the main switch 61 to the OFF state by pressing the main switch 61. That is, the driver has finished the ACC.

When the second finish condition is not satisfied, the CPU makes a determination of "No" in Step 313, and directly proceeds to Step 395 to temporarily finish this routine. As a result, the value of the second automatic start flag XA2 is maintained at "1". That is, in a situation in which the own vehicle is traveling on a general road, the operation mode of the automatic start control is maintained in the ON mode. Therefore, the automatic start control is executed each time the own vehicle stops in response to the stopping of the following target vehicle (a) on a general road (see a determination of "Yes" in Step 405 of the routine of FIG. 4).

In contrast, when the second finish condition is satisfied, the CPU makes a determination of "Yes" in Step 313, and proceeds to Step 314 to set the value of the second automatic start flag XA2 to "0". That is, the operation mode of the automatic start control is changed from the ON mode to the OFF mode. Further, the CPU sets the value of the second inquiry flag XB2 to "0". Then, the CPU proceeds to Step 395 to temporarily finish this routine. As a result, in a situation in which the own vehicle is traveling on a general road, the CPU makes a determination of "No" in Step 405 of the routine of FIG. 4 described later, and hence the automatic start control is not executed.

It is assumed that the CPU restarts the routine of FIG. 3 from Step 300 after the value of the second inquiry flag XB2 has been set to "1" and the value of the second automatic start flag XA2 has been set to "0" as described above (Step 308, Step 309: No, Step 311: Yes, and Step 312). When the CPU proceeds to Step 303, the CPU makes a determination of "No", and proceeds to Step 315.

In Step 315, the CPU determines whether or not a predetermined second reset condition is satisfied. The second reset condition is satisfied when any one of the following conditions F1 to F3 is satisfied.

(Condition F1): The own vehicle has moved from a general road to a limited-access road.

(Condition F2): An elapsed time Et2 from when the value of the second inquiry flag XB2 became "1" (that is, the time at which the processing of Step 308 was executed) has become equal to or longer than the predetermined second time threshold value Tm2.

(Condition F3): The driver has changed the state of the main switch 61 to the OFF state by pressing the main switch 61. That is, the driver has finished the ACC.

When the second reset condition is not satisfied, the CPU makes a determination of "No" in Step 315, and directly proceeds to Step 395 to temporarily finish this routine. Accordingly, the value of the second inquiry flag XB2 is maintained at "1", and hence the CPU makes a determination of "No" in Step 303. Therefore, on a general road, the inquiry processing (processing of Step 307) is not performed at least until the second reset condition is satisfied.

In contrast, when the second reset condition is satisfied, the CPU makes a determination of "Yes" in Step 315, and proceeds to Step 316 to set the value of the second inquiry flag XB2 to "0". Then, the CPU proceeds to Step 395 to temporarily finish this routine.

Figure 4:
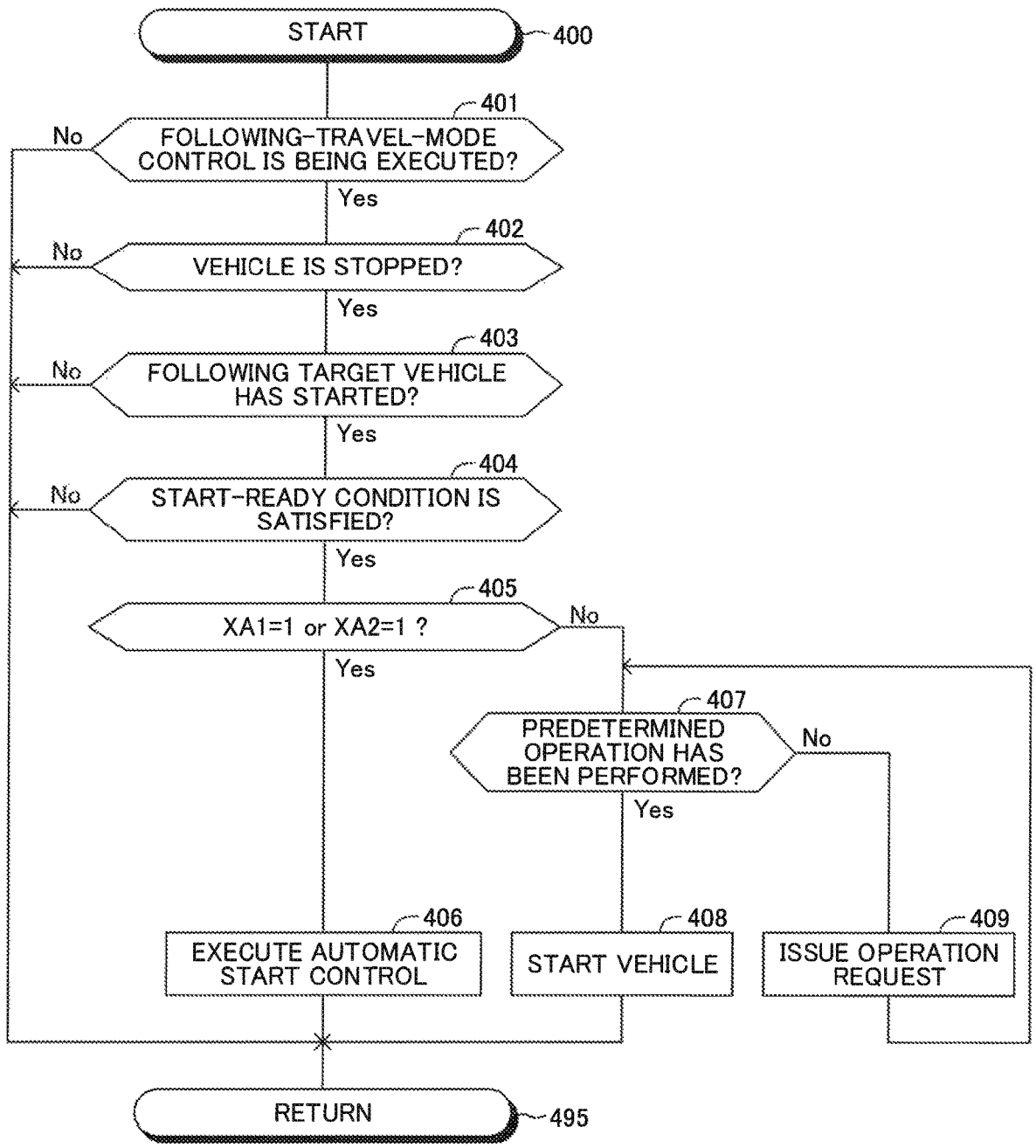
FIG. 4 is a flowchart for illustrating an "automatic start control execution routine" to be executed by the CPU of the driving support ECU illustrated in FIG. 1.

The CPU is also configured to execute the routine illustrated in FIG. 4 each time a predetermined time elapses.

When a predetermined timing is reached, the CPU starts the processing from Step 400 of FIG. 4, and proceeds to Step 401 to determine whether or not following-travel-mode control is being executed. When the following-travel-mode control is not being executed, the CPU makes a determination of "No" in Step 401, and directly proceeds to Step 495 to temporarily finish this routine.

In contrast, when the following-travel-mode control is being executed, the CPU makes a determination of "Yes" in Step 401, and proceeds to Step 402 to determine whether or not the own vehicle is stopped (that is, the vehicle speed SPD is zero). When the own vehicle is not stopped, the CPU makes a determination of "No" in Step 402, and proceeds directly to Step 495 to temporarily finish this routine.

When the own vehicle is stopped, the CPU makes a determination of "Yes" in Step 402, and proceeds to Step 403 to determine whether or not the following target vehicle (a) has started. Specifically, the CPU determines that the following target vehicle (a) has started when the relative speed Vfx (a) of the following target vehicle (a) has become equal to or higher than a predetermined start threshold value.

When the following target vehicle (a) has not started (that is, the following target vehicle (a) is stopped), the CPU makes a determination of "No" in Step 403, and proceeds directly to Step 495 to temporarily finish this routine.

In contrast, when the following target vehicle (a) has started, the CPU makes a determination of "Yes" in Step 403, and proceeds to Step 404 to determine whether the above-mentioned start-ready condition is satisfied.

When the start-ready condition is not satisfied, the CPU makes a determination of "No" in Step 404, and proceeds directly to Step 495 to temporarily finish this routine.

In contrast, when the start-ready condition is satisfied, the CPU makes a determination of "Yes" in Step 404, and proceeds to Step 405 to determine whether any one of the following conditions G1 and G2 is satisfied.

(Condition G1): The value of the first automatic start flag XA1 is "1".

(Condition G2): The value of the second automatic start flag XA2 is "1".

When any one of the condition G1 and the condition G2 is satisfied, the CPU makes a determination of "Yes" in Step 405, and proceeds to Step 406 to execute the automatic start control. Specifically, the CPU controls the brake actuator 31 by using the brake ECU 30 to release the braking force, and controls the engine actuator 21 by using the engine ECU 20 to start the own vehicle. Then, the CPU proceeds to Step 495 to temporarily finish this routine. Then, the CPU continues the following-travel-mode control with respect to the following target vehicle (a).

In contrast, when none of the condition G1 and the condition G2 is satisfied, the CPU makes a determination of "No" in Step 405, and proceeds to Step 407 to determine whether or not a predetermined operation has been performed. The predetermined operation is any one of the above-mentioned operation 1 (operation of pressing the resume switch 64) and operation 2 (operation of stepping on the accelerator pedal 11*a*). When the predetermined operation has been performed by the driver, the CPU makes a determination of "Yes" in Step 407, and proceeds to Step 408 to start the own vehicle. Specifically, the CPU controls the brake actuator 31 by using the brake ECU 30 to release the braking force, and controls the engine actuator 21 by using the engine ECU 20 to start the own vehicle. Then, the CPU proceeds to Step 495 to temporarily finish this routine. Then, the CPU continues the following-travel-mode control with respect to the following target vehicle (a).

In contrast, when the predetermined operation has not been performed by the driver, the CPU makes a determination of "No" in Step 407, and proceeds to Step 409. In Step 409, the CPU issues an operation request to the driver. Specifically, the CPU causes the display 51 to display a message for requesting the predetermined operation (any one of the above-mentioned operation 1 and operation 2), and causes the speaker 52 to utter the message. Then, the CPU returns to Step 407.

As described above, when the own vehicle has stopped in response to the stopping of the following target vehicle (a) during execution of the ACC and the operation mode of the automatic start control is set to the OFF mode, the control apparatus determines whether or not the current travel state of the own vehicle is the specific state in which there is a high probability that the driver desires the automatic start control to be executed.

When the own vehicle is stopped on a limited-access road, there is a high probability that the limited-access road is congested. Therefore, it is considered that the driver desires the automatic start control to be executed. In this case, the control apparatus determines that the current travel state of the own vehicle is the specific state.

In contrast, in a case in which the own vehicle is stopped on a general road, when a predetermined moving object (pedestrian and/or two-wheeled vehicle) exists around the vehicle, the driver may not desire the automatic start control to be executed. However, when there is no predetermined moving object around the vehicle, there is a high likelihood that the driver desires the automatic start control to be executed. Therefore, the control apparatus determines that the current travel state of the own vehicle is the specific state when the own vehicle is traveling on a general road and there is no predetermined moving object around the own vehicle.

When it is determined that the current travel state of the own vehicle is the specific state, the control apparatus causes the notification device (the display 51 and the speaker 52) to issue a notification for inquiring whether or not the driver desires the automatic start control to be executed. Thus, the control apparatus can issue an inquiry (propose) to the driver about execution of the automatic start control in accordance with the current travel state of the vehicle.

The control apparatus sets the operation mode of the automatic start control to the ON mode when the driver has performed the response operation (operation of pressing the automatic start switch 66) in response to the inquiry. Therefore, when the preceding vehicle starts, the automatic start control is executed in response to the starting of the preceding vehicle. In contrast, when the driver has not performed the response operation in response to the inquiry, the control apparatus sets the operation mode of the automatic start control to the OFF mode. In this case, the driver can start the own vehicle by performing the predetermined operation (any one of the operation 1 and the operation 2). Therefore, the driver can start the own vehicle at a timing at which the predetermined operation is performed. Thus, the control apparatus can determine whether or not to execute the automatic start control in accordance with the desire of the driver by inquiring whether or not the automatic start control is to be executed.

Further, when the driver has performed the response operation (when the operation mode of the automatic start control has been set to the ON mode), the control apparatus maintains the operation mode of the automatic start control in the ON mode until the predetermined finish condition (i.e., the first finish condition or the second finish condition) is satisfied. The control apparatus changes the operation mode of the automatic start control from the ON mode to the OFF mode when the predetermined finish condition is satisfied.

For example, it is assumed that the own vehicle is traveling in a traffic-congestion section on a limited-access road. In this case, the own vehicle travels at a low speed and stops repeatedly. Therefore, the condition B1 of the first finish condition is not satisfied. In such a situation, when the driver once performs the response operation, the operation mode of the automatic start control is maintained in the ON mode until the own vehicle passes through the traffic-congestion section. Therefore, on a limited-access road, the automatic start control is automatically executed each time the own vehicle stops in response to the stopping of the following target vehicle (a). In other words, the driver is not required to perform the response operation (operation of pressing the automatic start switch 66) each time the own vehicle stops. Therefore, the convenience of the driver is improved.

For example, it is assumed that the own vehicle is traveling in a traffic-congestion section on a general road. In such a situation, when the driver once performs the response operation, the operation mode of the automatic start control is maintained in the ON mode until the second finish condition is satisfied. When a pedestrian is detected around the own vehicle in a situation in which the own vehicle has stopped on a general road, the condition E1 of the second finish condition is satisfied. In this case, the operation mode of the automatic start control is changed to the OFF mode, and hence the automatic start control is not executed on the general road. Therefore, the likelihood of the own vehicle approaching the pedestrian around the own vehicle can be reduced.

The present disclosure is not limited to at least one embodiment described above, and various modification examples can be adopted within the scope of the present disclosure.

MODIFICATION EXAMPLE 1

The first specific state condition is not limited to the example described above. The first specific state condition may include the following condition A2.
(Condition A2): The own vehicle is traveling in a traffic-congestion section.

The driving support ECU 10 may determine whether or not the own vehicle is traveling in a traffic-congestion section based on the road traffic information (including the traffic-congestion section information) received via the communication device 44.

The driving support ECU 10 may also be configured to store information on the "vehicle speed SPD for the latest predetermined period (e.g., 5 minutes)" of the own vehicle in the RAM 103. Further, the driving support ECU 10 may determine that the own vehicle is traveling in a traffic-congestion section when both the following conditions H1 and H2 are satisfied. The conditions H1 and H2 are conditions for determining whether or not the own vehicle travels at a low speed and stops repeatedly.
(Condition H1): The minimum value of the vehicle speed SPD in the predetermined period is "zero".
(Condition H2): The maximum value of the vehicle speed SPD in the predetermined period is equal to or less than a predetermined low speed threshold value.

As another example, the driving support ECU 10 may determine that the own vehicle is traveling in a traffic-congestion section based on the object information (information on the following target vehicle (a)). The driving support ECU 10 may determine that the own vehicle is traveling in a traffic-congestion section when both of the following conditions I1 and I2 are satisfied.
(Condition I1): The minimum value of the vehicle speed (Vs) of the following target vehicle (a) in the latest predetermined period (e.g., 5 minutes) is "zero".
(Condition I2): The maximum value of the vehicle speed (Vs) of the following target vehicle (a) in a predetermined period is equal to or less than the predetermined low speed threshold value.

With this configuration, the inquiry processing is executed when it is considered that there is a high probability that the driver desires the automatic start control to be executed on a limited-access road (when the own vehicle is traveling in a traffic-congestion section). Further, when the driver performs the response operation in response to the inquiry processing, the operation mode of the automatic start control is set to the ON mode.

MODIFICATION EXAMPLE 2

In addition, the first specific state condition may include the following condition A3.
(Condition A3): When it is assumed that the automatic start control is to be executed, a predetermined moving object that may approach the own vehicle is not detected. The predetermined moving object is, for example, another vehicle (b) attempting to enter between the own vehicle and the following target vehicle (a) by changing lanes.

The camera sensor 14b recognizes a partition line of the road (the travel lane along which the vehicle is traveling and the adjacent lane adjacent to the travel lane) based on the image data, and identifies a positional relationship between the object and the road (the travel lane and the adjacent lane). Further, the CPU of the driving support ECU 10 determines whether or not another vehicle (b) exists in the adjacent lane based on the object information. When the direction of the relative lateral speed Vfy(b) of the another vehicle (b) is toward the travel lane and the magnitude of the relative lateral speed Vfy(b) is equal to or more than a predetermined lateral speed threshold value, the CPU determines that the another vehicle (b) is attempting to enter between the own vehicle and the following target vehicle (a) by changing lanes. In this case, the above-mentioned condition A3 is not satisfied.

With this configuration, the inquiry processing is not executed when another vehicle (b) is attempting to enter between the own vehicle and the following target vehicle (a) in a situation in which the own vehicle is stopped. As a result, the operation mode of the automatic start control is not changed to the ON mode. Therefore, it is possible to prevent the own vehicle from approaching the another vehicle (b).

MODIFICATION EXAMPLE 3

The second specific state condition is not limited to the example described above. The second specific state condition may include the following condition D3.

(Condition D3): The own vehicle is traveling in a traffic-congestion section.

As described above, the CPU may determine whether or not the own vehicle is traveling in a traffic-congestion section based on any one of the road traffic information (including information on a traffic-congestion section), the information on the vehicle speed SPD, and the object information (information on the following target vehicle (a)).

MODIFICATION EXAMPLE 4

The second specific state condition may include the following condition D4.

(Condition D4): There is no predetermined stop point within a predetermined distance range ahead of the own vehicle. This predetermined stop point is a point at which the own vehicle is to stop, and includes, for example, an intersection and a railroad crossing.

With this configuration, the inquiry processing is not executed when there is a predetermined stop point ahead of the own vehicle on a general road. Therefore, when there is the predetermined stop point ahead of the own vehicle, the operation mode of automatic start control is not changed to the ON mode. As a result, it is possible to inhibit the own vehicle from advancing past the stop point.

MODIFICATION EXAMPLE 5

The driving support ECU 10 may be configured to execute the automatic start control only on limited-access roads. That is, the routine of FIG. 3 may be omitted.

MODIFICATION EXAMPLE 6

The driving support ECU 10 may be configured to execute the automatic start control only on general roads. That is, the routine of FIG. 2 may be omitted.

MODIFICATION EXAMPLE 7

The first specific state condition and the second specific state condition may each be a condition including only the following condition J1.

(Condition J1): A predetermined moving object (pedestrian and/or two-wheeled vehicle) is not detected within a predetermined distance range from the own vehicle.

MODIFICATION EXAMPLE 8

The driving support ECU 10 may be configured to execute the automatic start control without distinguishing whether the road on which the own vehicle is traveling is a limited-access road or a general road. For example, when the own vehicle is traveling in a traffic-congestion section, the driving support ECU 10 may determine that the current travel state of the own vehicle is the specific state, and cause the notification device to execute the inquiry processing.

MODIFICATION EXAMPLE 9

The inquiry processing may be performed by using any one of the display 51 and the speaker 52. Further, a message for inquiring whether or not to execute the automatic start control may be displayed on a display other than the display 51. For example, the driving support ECU 10 may display the above-mentioned message on the touch panel 43.

MODIFICATION EXAMPLE 10

The switch for performing the response operation (approval operation) in Step 209 and Step 309 is not limited to the above-mentioned example, and may be any switch/button that can be operated when the driver responds to the inquiry processing. Specifically, in place of the automatic start switch 66, a switch/button described below may be employed in order to perform the response operation.

For example, the driving support ECU 10 may cause the touch panel 43 to display a message for inquiring whether or not to execute the automatic start control and a response button. In this case, when the driver performs a touch operation on the response button, the CPU sets the operation mode of the automatic start control to the ON mode. As another example, any of the switches 61 to 65 may further have a function of responding to the inquiry processing. Further, a switch/button for approving or instructing execution of control other than ACC (e.g., lane keeping assist (LKA) and parking assist control) may further have a function of performing the response operation of Step 209 and Step 309.

What is claimed is:
1. A vehicle travel control apparatus, comprising:
   a vehicle controller configured to execute following-travel inter-vehicle-distance control of causing the own vehicle to follow a preceding vehicle traveling immediately ahead of the own vehicle, and to execute automatic start control of causing the own vehicle to automatically start when the preceding vehicle starts after the own vehicle has been stopped; and
   a notification device comprising at least one of a display or a speaker, the notification device configured to issue to a driver a notification for inquiring whether the driver desires the automatic start control to be executed;
   wherein the vehicle controller is configured to:
      determine, when the own vehicle has stopped in response to the stopping of the preceding vehicle, whether a current travel state of the own vehicle is a specific state, in which there is a probability that the driver desires the automatic start control to be executed;
      determine, whether a second specific state condition is satisfied, the second specific state condition being satisfied upon determination that there is no predetermined stop point within a predetermined distance range ahead of the own vehicle, the predetermined stop point being a point at which the own vehicle is to stop; and cause the notification device to issue the notification upon determination that the specific state and the second specific state condition are satisfied.

2. The vehicle travel control apparatus according to claim 1, wherein the predetermined stop point includes an intersection or a railroad crossing.

3. The vehicle travel control apparatus according to claim 1,
wherein the vehicle controller is configured to set an operation mode of the automatic start control to any one of a first mode, in which the automatic start control is executed, and a second mode, in which the automatic start control is inhibited from being executed,
the vehicle controller being further configured to, when the operation mode is set to the first mode:
maintain the operation mode in the first mode until a predetermined finish condition is satisfied; and
change the operation mode from the first mode to the second mode when the predetermined finish condition is satisfied.

4. The vehicle travel control apparatus according to claim 1, comprising an electronic control unit comprising a database, the electronic control unit configured to acquire, as a vehicle peripheral information, road information, which is information on a type of a road on which the own vehicle is traveling;
wherein the vehicle controller is configured to:
determine, based on the vehicle peripheral information, whether a first specific state condition is satisfied, the first specific state condition being satisfied when the own vehicle is traveling on a limited-access road; and
determine, upon determination that at least the first specific state condition is satisfied, that the travel state is the specific state.

5. The vehicle travel control apparatus according to claim 4, wherein the vehicle controller is configured to:
determine, based on the vehicle peripheral information, whether a traffic-congestion condition is satisfied, the traffic-congestion condition being satisfied when the own vehicle is traveling in a traffic-congestion section; and
determine, upon determination that the traffic-congestion condition is satisfied in addition to the first specific state condition, that the travel state is the specific state.

6. The vehicle travel control apparatus according to claim 5,
wherein the vehicle controller is configured to:
determine, based on the vehicle peripheral information, whether the second specific state condition is satisfied, the second specific state condition being satisfied when the own vehicle is traveling on a general road and a predetermined moving object does not exist around the own vehicle; and
determine, upon determination that at least the second specific state condition is satisfied, that the travel state is the specific state.

7. The vehicle travel control apparatus according to claim 6, wherein the vehicle controller is configured to:
determine, based on the vehicle peripheral information, whether a traffic-congestion condition is satisfied, the traffic-congestion condition being satisfied when the own vehicle is traveling in a traffic-congestion section; and
determine, upon determination that the traffic-congestion condition is satisfied in addition to the second specific state condition, that the travel state is the specific state.

8. A control method performed by a vehicle travel control apparatus, the control method comprising:
executing by a computer following-travel inter-vehicle-distance control of causing the own vehicle to follow a preceding vehicle traveling immediately ahead of the own vehicle, and executing automatic start control of causing the own vehicle to automatically start when the preceding vehicle starts after the own vehicle has been stopped;
issuing by a notification device to a driver a notification for inquiring whether the driver desires the automatic start control to be executed;
determining by the computer, when the own vehicle has stopped in response to the stopping of the preceding vehicle, whether a current travel state of the own vehicle is a specific state, in which there is a probability that the driver desires the automatic start control to be executed;
determining by the computer, whether a second specific state condition is satisfied, the second specific state condition being satisfied upon determination that there is no predetermined stop point within a predetermined distance range ahead of the own vehicle, the predetermined stop point being a point at which the own vehicle is to stop; and
causing by the notification device to issue the notification upon determination that the specific state and the second specific state condition are satisfied.

9. A non-transitory computer-readable medium storing a program configured to cause a computer, as a vehicle travel control apparatus, to execute:
executing following-travel inter-vehicle-distance control of causing the own vehicle to follow a preceding vehicle traveling immediately ahead of the own vehicle, and executing automatic start control of causing the own vehicle to automatically start when the preceding vehicle starts after the own vehicle has been stopped;
issuing by a notification device to a driver a notification for inquiring whether the driver desires the automatic start control to be executed;
determining, when the own vehicle has stopped in response to the stopping of the preceding vehicle, whether a current travel state of the own vehicle is a specific state, in which there is a probability that the driver desires the automatic start control to be executed;
determining, whether a second specific state condition is satisfied, the second specific state condition being satisfied upon determination that there is no predetermined stop point within a predetermined distance range ahead of the own vehicle, the predetermined stop point being a point at which the own vehicle is to stop; and
causing by the notification device to issue the notification upon determination that that the specific state and the specific state condition are satisfied.

* * * * *